Patented Feb. 3, 1942

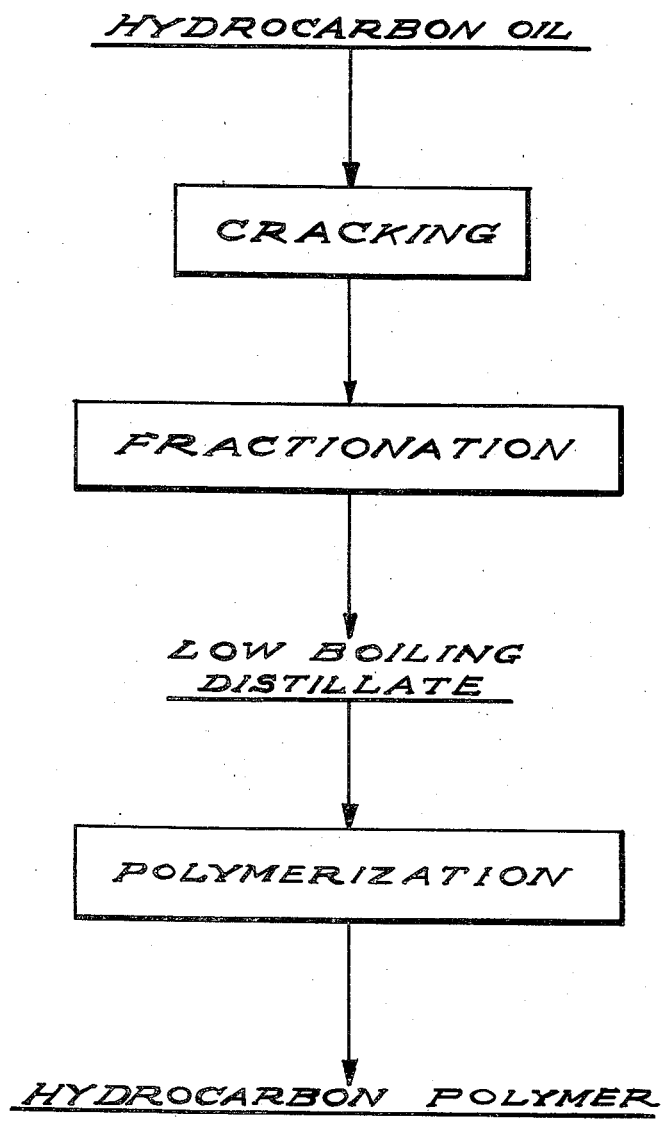

2,271,636

UNITED STATES PATENT OFFICE 2,271,636

PREPARATION OF HYDROCARBON POLYMERS AND PRODUCTS THEREOF

Per K. Frolich, Roselle, N. J., assignor to Standard Oil Development Company, a corporation of Delaware Application June 6, 1933, Serial No. 674,546

10 Claims. (Cl. 196—78)

This invention relates to the production of high molecular weight polymerization products from unsaturated hydrocarbons and more particularly to the preparation of such polymers from the volatile products obtained on cracking hydrocarbon oils.

It has been found that valuable high molecular weight plastic solid polymerization products capable of markedly improving the viscosity characteristics of lubricating oils when added thereto in small proportions may be obtained by treating cracked hydrocarbon products at a low temperature with polymerizing agents. Viscous oils similarly useful as lubricating oil blending agents or for use alone as lubricants may also be obtained concurrently with the plastic solid products, or separately, by suitable modification of this invention.

The drawing is a diagrammatic representation of the process of this invention.

Suitable cracked products for this invention are the low boiling and the normally gaseous products, containing unsaturated hydrocarbons, obtained by cracking, destructive distillation or destructive hydrogenation of carbonaceous materials such as coal, lignite, peat, mineral oils, petroleum, and fractions of such materials obtained by liquefaction, distillation, extraction or other suitable means either before or after the cracking or other destructive treatment. Particularly desirable polymerization products are obtained when the materials subjected to the polymerizing treatment contain iso-olefines, notably isobutylene.

Suitable treating agents for this process are the active halide polymerizing agents, including the volatile inorganic halides and metal halides. Boron fluoride and antimony trifluoride are particularly desirable agents for promoting the formation of polymerization products of the type described herein. The metal halides are particularly effective when prepared in statu nascendi. For example, aluminum chloride may be prepared by reaction of hydrogen chloride on aluminum foil in contact with the cracked products to be treated. The halides may also be employed as catalysts in the form of double compounds or in solution in suitable inert solvents such as the aliphatic or aromatic alcohols, or phenol or cresol.

The polymerization products obtained by this invention are usually substantially colorless and clear, when freed from polymerizing agent and water, and are viscous oils or plastic solids of a sticky and somewhat elastic quality. They may be depolymerized to gaseous or low boiling compounds without formation of coke by heating to cracking temperatures above about 575° F. The solid products have a molecular weight above about 2000, and products having a molecular weight above 4000 or 5000 may be prepared. These polymers are soluble in liquid hydrocarbons in all proportions, and are useful in improving the viscosity characteristics of lubricating oils. By the addition of a few per cent. of such polymer to a lubricating oil, the viscosity and the viscosity index of the lubricating oil are markedly increased. The polymerization products may also be used in suitable fuel compositions with gasoline and other motor fuels, in surface coating and impregnating compositions with solvent naphthas, in medicinal and lubricating white oils, and in paraffin wax and like products. Generally the use of only a small amount, say ½ to 1 to 2 to 5% of the polymer is sufficient, but larger amounts may be used as desired, and will be found preferable with polymers of relatively low molecular weight, say below about 1500 to 800.

The molecular weight of the polymerization product depends upon the time required to complete the reaction, the temperature at which the reaction is conducted, and the concentration and type of olefines in the naphtha to be treated. Products of relatively lower molecular weight are generally obtained when the reaction is conducted at a slower rate, at a higher temperature, or with feed stocks of a relatively wide boiling range, and vice versa. Generally, reaction temperatures below 32° F. are preferred when semi-solid products of relatively high molecular weight are desired, while temperatures up to about 100° F. or higher may be used for the production of viscous lubricating oils. The relatively low molecular weight oily polymers may be cracked and the cracked products re-polymerized at low temperatures to obtain solid polymerization products of 5,000 to 10,000 average molecular weight.

The following examples illustrate suitable methods for preparing polymerization products from a cracked hydrocarbon oil.

*Example 1*

A fractionating column operating on a mixture of light naphthas obtained in the cracking of petroleum oils and the distillation of the cracked products makes a separation between the butanes and heavier hydrocarbons and the propanes and lighter, and produces a distillation residue, known as "stabilizer bottoms," of the following average characteristics:

| | Per cent |
|---|---|
| Propane and lighter constituents | Below 1 |
| Butanes and butenes | 40 |
| Pentanes and pentenes | 40 |
| Hexanes and hexenes | 16.5 |
| Higher boiling hydrocarbons | 3.5 |
| Total unsaturated hydrocarbons | (Approx.) 35 |

98% distilled at 190° F.

These stabilizer bottoms are redistilled and the lightest distillate fraction, boiling below about 50° F., is separately withdrawn. This fraction, the butane cut, contains about 97% butanes and butylenes including about 15 to 25% isobutylene. 100 parts by weight of this butane cut are cooled to —80° F. with carbon dioxide snow, an excess of the snow being added directly to the cooled naphtha. Then boron fluoride is passed into the mixture for about 2 minutes, during which time the mixture is vigorously agitated with paddles and maintained at about —80° F. by addition of carbon dioxide snow. The boron fluoride is supplied at such a rate that an excess above the amount required for the completed reaction is passed into the mixture in about two to five minutes.

The necessary amount of boron fluoride for the completed reaction may be determined in a small scale preliminary test by rapidly bubbling a large excess of boron fluoride through a small amount of the cooled hydrocarbon mixture, and measuring the maximum consumption of boron fluoride. As the reaction is exothermic and causes vaporization of the carbon dioxide snow present, the completion of the reaction may be roughly determined by the decrease in evolution of carbon dioxide from the reaction mixture. To obtain products of high molecular weight it is preferable to complete the reaction in less than about 5 minutes.

The reaction mixture then obtained contains a solution of the desired polymerization product in the unreacted light paraffin hydrocarbons. Various methods for the separation and purification of this polymerization product will be readily apparent to a skilled chemist. For example the reaction mixture is warmed up to room temperature, the light hydrocarbons being removed by vaporization. An aqueous solution of an alcohol, such as a 50% isopropyl alcohol solution, is added at the same time, causing the hydrolysis of boron fluoride held in the mixture. A thick, slimy precipitate is thrown out on the addition of the alcohol solution. The resulting liquid is then decanted. The precipitate is kneaded in a current of steam to complete the evaporation of light hydrocarbons and there are obtained 17 parts by weight of a plastic solid crude polymerization product of approximately 5,000 to 6,000 average molecular weight. This product may be further purified by solution in benzol, filtration of any undissolved sludge, and then precipitated from the benzol solution by addition of acetone. The precipitate is again kneaded to dryness in a current of air or steam. There is thus obtained a purified polymerization product of somewhat higher molecular weight, for example, about 6,000 to 7,000 average molecular weight. This product is a clear, colorless plastic solid of somewhat sticky and elastic properties. It is soluble in all proportions in hydrocarbon oils.

*Example 2*

The total "stabilizer bottoms" fraction shown in Example 1 is cooled to about —95° F. An excess of boron fluoride is bubbled through the cooled naphtha in about one quarter hour, during which time the naphtha is vigorously stirred and is maintained at about —95° F. by addition of carbon dioxide snow. The reaction mixture is then allowed to warm up to room temperature, thereby vaporizing most of the unreacted light fractions. The remaining mixture is then washed with water and the oil layer is heated to remove fractions boiling below 212° F. by distillation. The distillation residue is a heavier oil fraction with a gravity of 33.7° A. P. I. and is obtained in a yield of 16.9% by weight, based on the stabilizer bottoms treated. This oil is then mixed with acetone and a precipitate of a plastic high molecular weight polymer, similar to that prepared in Example 1, is obtained in a yield of 33.2% by weight, based on the oil. This polymer is of 1,000 to 2,000 average molecular weight. The acetone and oil layer is decanted, the acetone removed by distillation, and an oil of 33.7° A. P. I. @ 60° F. and 80 seconds Saybolt viscosity at 100° F. is obtained.

*Example 3*

70.8 gms. of boron fluoride are added to 2113 gms. of stabilizer bottoms in a closed bomb. The bomb is shaken for two hours at a temperature of about 80° F. The reaction mixture is washed with water and 1656 gms. of an oil layer are recovered, some being lost by vaporization of light ends. The fractions of this oil boiling up to 300° F. are removed by distillation, leaving a residual fraction amounting to 10.6% by volume of the total oil layer. 13% of the oil removed is distilled between 160 and 212° F., and 6.9% between 212° and 300° F. The residual oil fraction gives no precipitate on dilution with acetone, and is a good solvent for the gums which separate from gasoline.

Distillation of this oil at 10 mm. pressure gives the following results:

20% off below 161° F.
20% off between 161 and 302° F.
20% off between 302 and 425° F.
10% off between 425 and 500° F.
10% residue.

The viscosity characteristics of blends of the various fractions obtained are as follows:

| Boiling point °F. @ 5.5 mm. Hg | 275–345 | above 345 |
|---|---|---|
| Viscosity—seconds Saybolt— | | |
| At 100° F. | 615 | 1286 |
| At 210° F. | 34.5 | 85 |
| Viscosity index | | 57 |

The process described in the above examples may also be conducted with other fractions of stabilizer bottoms and with volatile fractions of cracked hydrocarbon oils generally. It is preferable that the naphtha subjected to the polymerization treatment shall contain unsaturated hydrocarbons boiling below about 70° F. Cracked naphthas boiling from —40 to 120° F., —10 to 70° F., —10 to 50° F., —5 to 15° F., and —40 to 15° F. may be mentioned as examples of suitable feed stocks for this invention.

*Example 4*

A polymer of about 5,000 to 6,000 molecular weight, obtained from the butane cut of stabilizer bottoms as described in Example 1, is added in small amounts to a petroleum lubricating oil.

The viscosity characteristics of the original oil and the resulting blends are:

|  | Base stock | Blends | |
|---|---|---|---|
| Polymer, percent by weight | 0 | 1 | 2 |
| Viscosity—Saybolt seconds— | | | |
| @ 100° F | 204 | 275 | 370 |
| @ 210° F | 46.6 | 53 | 62 |
| Viscosity index | 93 | 116 | 123 |

This invention is not to be limited to any examples which have been given merely in illustration, nor to any theory of the structure or means of formation of these products.

I claim:

1. Process for preparing high molecular weight polymerization products having the properties of plastic solids rather than of viscous lubricating oils, soluble in hydrocarbon oils and capable of improving the viscosity-temperature characteristics of lubricating oils when blended therewith, which comprises cracking a hydrocarbon oil to produce a mixture of normally liquid and gaseous products, separating from said cracked products by difference in volatility a fraction boiling substantially completely below 70° F. which consists substantially completely of a mixture of hydrocarbons boiling in the range of butanes and butenes and which contains a substantial amount of isobutylene, treating said fraction in liquid phase with a halide polymerizing agent at a reaction temperature maintained sufficiently below 32° F. throughout the reaction to produce a high molecular weight plastic solid mixture of polymerization products and separating from the resulting reaction mixture the said high molecular weight plastic solid polymerization products.

2. Process for preparing high molecular weight polymerization products according to claim 1, in which the reaction is carried out at a temperature of the order of —80° F. to —95° F.

3. Process according to claim 1 in which the resulting reaction mixture is hydrolyzed and water soluble constituents and unreacted hydrocarbons are removed therefrom to secure said high molecular weight polymerization product.

4. Process according to claim 1 in which the fraction of said cracked products comprises a distillate fraction boiling within the approximate limits of 120 and —40° F.

5. Process according to claim 1 in which the said fraction of cracked products comprises a distillate fraction boiling between 15 and —5° F.

6. Process according to claim 1 in which the said treatment with an active halide comprises the addition of boron fluoride to said cracked fraction in liquid phase at a temperature below 32° F. with vigorous agitation and at a sufficiently rapid rate to secure a substantially complete reaction within a time of less than about five minutes.

7. Process for preparing high molecular weight polymerization products having the properties of plastic solids rather than of viscous lubricating oils, soluble in hydrocarbon oils and capable of improving the viscosity-temperature characteristics of lubricating oils when blended therewith, which comprises cracking a hydrocarbon oil to produce a mixture of normally liquid and gaseous products, separating from said cracked products a fraction consisting substantially entirely of hydrocarbons of 3, 4 and 5 carbon atoms per molecule and consisting of hydrocarbons of 4 carbon atoms per molecule in major part, the said fraction containing both normal olefins and iso-olefins and being accompanied by corresponding saturated aliphatic hydrocarbons, treating said fraction in liquid phase with a halide polymerizing agent at a reaction temperature maintained sufficiently below 32° F. throughout the reaction to produce a high molecular weight plastic solid mixture of polymerization products and separating from the resulting reaction mixture the said high molecular weight plastic solid polymerization products.

8. Improved plastic solid polymerization products having a molecular weight above about 2,000, soluble in hydrocarbon oils and capable of improving the viscosity-temperature characteristics of lubricating oils when blended therewith, prepared by cracking a hydrocarbon oil to produce a mixture of normally liquid and gaseous products, separating from said cracked products a fraction consisting substantially entirely of hydrocarbons of 3, 4 and 5 carbon atoms per molecule and consisting of hydrocarbons of 4 carbon atoms per molecule in major part, the said fraction containing both normal olefins and iso-olefins and being accompanied by corresponding saturated aliphatic hydrocarbons, treating said fraction in liquid phase with a halide polymerizing agent at a reaction temperature maintained sufficiently below 32° F. throughout the reaction to produce a high molecular weight plastic solid mixture of polymerization products and separating from the resulting reaction mixture the said high molecular weight plastic solid polymerization products.

9. Improved plastic solid polymerization products having a molecular weight above about 2,000, soluble in hydrocarbon oils and capable of improving the viscosity-temperature characteristics of lubricating oils when blended therewith, prepared by cracking a hydrocarbon oil to produce a mixture of normally liquid and gaseous products, separating from said cracked products by difference in volatility a fraction boiling substantially completely below 70° F. which consists substantially completely of a mixture of hydrocarbons boiling in the range of butanes and butenes and which contains a substantial amount of isobutylene, treating said fraction in liquid phase with a halide polymerizing agent at a reaction temperature maintained sufficiently below 32° F. throughout the reaction to produce a high molecular weight plastic solid mixture of polymerization products and separating from the resulting reaction mixture the said high molecular weight plastic solid polymerization products.

10. Process according to claim 7 in which said fraction of cracked products consists substantially completely of components boiling in the range of butanes and butenes.

PER K. FROLICH.